(12) United States Patent
King

(10) Patent No.: US 6,587,122 B1
(45) Date of Patent: Jul. 1, 2003

(54) INSTRUCTION SYNTAX HELP INFORMATION

(75) Inventor: Bradley S. King, Apex, NC (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 09/016,796

(22) Filed: Jan. 30, 1998

(51) Int. Cl.$^7$ ............................................. G06F 17/30
(52) U.S. Cl. ................................. 345/708; 345/780
(58) Field of Search ........................... 345/338, 336, 345/337, 333, 340, 341–347, 348–349, 352, 353, 354, 356–357, 811–814, 708, 710, 711, 714, 780, 802; 707/4, 530; 704/8; 717/5

(56) References Cited

U.S. PATENT DOCUMENTS

| | | | | |
|---|---|---|---|---|
| 5,421,730 A | * | 6/1995 | Lasker, II et al. | 434/118 |
| 5,485,618 A | * | 1/1996 | Smith | 345/705 |
| 5,542,024 A | * | 7/1996 | Balint et al. | 345/338 |
| 5,668,928 A | * | 9/1997 | Groner | 704/243 |
| 5,694,399 A | * | 12/1997 | Jacobson et al. | 371/22.3 |
| 5,812,850 A | * | 9/1998 | Wimble | 395/704 |
| 5,848,393 A | * | 12/1998 | Goodridge et al. | 705/8 |
| 5,864,340 A | * | 1/1999 | Bertram et al. | 345/780 |
| 5,984,503 A | * | 11/1999 | Strickland et al. | 364/468.01 |
| 5,991,794 A | * | 11/1999 | Hodges et al. | 709/107 |
| 6,016,467 A | * | 1/2000 | Newsted et al. | 704/9 |
| 6,026,233 A | * | 2/2000 | Shulman et al. | 345/808 |
| 6,101,498 A | * | 8/2000 | Scaer et al. | 707/10 |
| 6,257,774 B1 | * | 7/2001 | Stack | 395/705 |
| 6,292,712 B1 | * | 9/2001 | Bullen | 700/245 |
| 6,414,699 B1 | * | 7/2002 | Pittore | 345/808 |

* cited by examiner

*Primary Examiner*—Steven Sax
(74) *Attorney, Agent, or Firm*—Foley & Lardner; Alexander M. Gerasimow; William R. Walbrun

(57) ABSTRACT

A system for displaying instruction syntax help information to a user as instructions are entered into an editor or other tool. The instruction syntax is presented with the next parameter in the instruction highlighted to prompt the user for entry of that parameter. A database of instructions and their syntax is provided to facilitate efficient search and retrieval of the instruction syntax for each instruction of the language.

22 Claims, 7 Drawing Sheets

INSTRUCTION SYNTAX HELP INFORMATION

FIELD OF THE INVENTION

This invention relates generally to help facilities on a data processing system; and more particularly, it relates to a method of providing instruction syntax help information as instructions are entered.

BACKGROUND OF THE INVENTION

The invention generally relates to data entry systems of the type employing a keyboard or other data entry user interface and a display screen such as a Cathode Ray Tube (CRT) or similar display for displaying data entered by the user. More particularly, the invention is directed to a screen help technique to assist the user in the correct entry of data. A typical data entry system in which the technique according to the invention can be advantageously used ranges from small, self-contained microcomputer systems generally referred to as personal computers to mainframe systems having a plurality of terminals.

Conventionally, a data entry system is designed to display a "screen" or "menu" having a plurality of data entry labels or categories with blanks immediately adjacent each data entry label or category. It is in these blanks where the user is required to enter the corresponding data. The blanks may be delineated by an underline or some other demarcation to show the user where the data is going by category. The blanks have a predefined length in terms of the number of characters that can be accepted by the system for the corresponding categories, and the underlining or other demarcation would also serve the purpose of showing the length as well as the location of the data required Such "screens" or "menus" can be generated by a screen generator which is a computer program written specifically for that purpose. Those skilled in the art will also know that a screen generator program can be written from scratch very simply by using BASIC or other suitable computer programming languages. A characteristic of the "screens" or "menus" which are produced for data entry purposes is that the cursor which is displayed on the screen can only be placed in one of the designated blanks and no where else on the screen. Thus, data entry is limited to predefined areas on the screen, and these areas themselves provide the interface with the data entry program which is requesting the data. In other words, the user is relieved of the burden of telling the data entry program what category of data is being entered since the data entry program will recognize the category by the location on the screen in which the data is entered.

Obviously, the data entry system just described is a very good one in that it is simple and easy to use. In those cases where the type of data is routine such as would be encountered in motor vehicle statistics and employee records, it takes very little time for a user to become proficient in making data entries. In those cases where the user is just learning the system, help can be provided by a manual. It is also known to provide a special "help" key or command for the user to call up a "help" screen or menu if she is uncertain about the entry of certain data. Typically, such a menu obstructs all or at least part of the data entry screen and provides a set of instructions or explanations which merely repeat those which would be found in the manual. This procedure has the advantage of allowing the user quick reference to instructions or explanations without having to fumble through the manual.

There are certain situations, however, where the data entry is not routine. For example, if the user does not regularly use the data entry system, it may take the user some time to remember the data entry procedure and the quality and quantity of data required by the system. Obviously, the display of a full or partial screen menu of "help" instructions or explanations will save some time for the user by avoiding the time spent leafing through a manual. But the user will still have to study the information presented and make some judgements to apply those instructions or explanations to their requirements. In another example, the data entry system may be used for purposes of configuring a control program for a particular application. An example of such a system is disclosed in U.S. Pat. No. 4,644,478, filed Sep. 13, 1983, by Lawrence Keith Stephens and Robert B. Hayes for "Monitoring and Alarm System for Custom Applications." Especially in this type of situation, the data entered is unique to the particular application and, although the data entry screen is designed to promote ease of data entry, the user may at times need better quality help than is provided by manuals or help screens.

As computer technology has progressed, particularly with the advent of the personal computer, data processing has reached every level of society and user. Most of the software used with personal computers is highly interactive in that the actions taken by the system are dependent upon the actions taken by the operator of the computer system. Examples of such application programs are various text processing programs and spread sheets. The commercial acceptability of any application program is largely dependent on how "user friendly" that program appears to the user. There are a variety of means of helping the user interact with a program, but one of the more important means is some sort of help facility which the user can call upon for assistance.

In the prior art, help information is usually provided in a window on the same screen from which the help is requested. The information in these windows is usually hard coded into the application itself. This type of help facility is basically a condensed version of the operating guide for the application software. This type of help facility is used in a manner similar to the operating guide, except that it is automated. The user may be forced to navigate through one or more panels in text lists in pursuit of an answer to her problem. More information is generally provided than is required.

An improvement in summoning help is "contextual help" which is dependent on the context of the help request. Several types are known in the art. The least context driven is called application contextual; "help" is a selectable action on a menu bar to be chosen by the user if she requires help with a particular application.

Panel contextual help is more context driven than application contextual. Help request areas are present in each panel to summon help information related to the particular panel. Sometimes the displayed help information will carry a heading referring to the panel which helps correlate the help information and the panel last used by the user.

The most selective means of providing contextual help is to provide help based on the current cursor position in the window in the active application. This method is called cursor focus contextual. However, when help is displayed in conjunction with the position of the pointer, it is generally displayed in a dedicated area far from the pointer position and is not very natural to access for the user. Further, while cursor focus contextual methods exist, the prior art fails to provide help information on those areas on the screen where cursor focus cannot be established. For example, certain system controls, graphics, read-only text, etc. in certain applications, cannot receive the cursor focus. Often, help is very badly needed in these areas.

In sophisticated computer programs, a specialized type of help information concerns the changing status of the various components of the system, either hardware or software. A graphical user interface is a particularly useful means of presenting this type of information, yet until a user becomes familiar with icons associated with the various states of the system additional help may be required. As status information continually changes, some means for dynamic updating must be provided.

Another problem with most help systems is that they force the system into a help mode in which actions on the application cannot be taken. This leads to a frustrating situation, particularly for a novice user, in which the user must repeatedly alternate between mutually exclusive help and application modes, while remembering the status of the application or help information while interacting with the system. It is somewhat ironic that the system which provides help to the user, also gets in her way.

To be most effective, help information should be displayed near the focus of the user's attention, e.g., a mouse pointer. However, the previous methods either use a dedicated area of the window, or display too much information and obscure the information being displayed by the application.

SUMMARY OF THE INVENTION

An object of the invention is to provide instruction help and status information dynamically as instructions and their corresponding parameters are entered.

It is another object of this invention for the help or status information to follow the focus of the user's attention as it moves across the graphical user interface.

It is another object of this invention to minimize the number of windows or keystrokes needed by the user to access help or status information.

It is another object of the invention to provide help or status information while allowing the user to simultaneously interact with the underlying application.

It is another object of the invention to provide detailed help on portions of the graphical user interface for which the user's focus currently resides.

It is an other object to present help and status information in a nonintrusive manner.

These and other objects are accomplished by a method of displaying contextual help or status information to the user of a computer system. A system for displaying instruction syntax help information to a user as instructions are entered into an editor or other tool. The instruction syntax is presented with the next parameter in the instruction highlighted to prompt the user for entry of that parameter. A database of instructions and their syntax is provided to facilitate efficient search and retrieval of the instruction syntax for each instruction of the language.

BRIEF DESCRIPTION OF THE DRAWINGS

These and other objects and features will become more easily understood by reference with the attached drawings and following description, in which.

DETAILED DESCRIPTION

A preferred embodiment may be run on a variety of computers under a number of different operating systems. The computer could be, for example, a personal computer, a mini computer or a mainframe computer. The computer may be a stand-alone system, part of a network such as a local area network or wide area network or a larger teleprocessing system. For purposes of illustration only, a preferred embodiment is described below as implemented on a personal computer, such as an IBM's compatible series, although the specific choice of computer is limited only by memory and disk storage requirements. For additional information on IBM's series of computers, the reader is referred to Technical Reference Manual Personal System/2 (Model 50, 60 Systems), IBM Corporation, Part No. 68X2224, Order No. S68X-2224, and Technical Reference Manual, Personal System/2 (Model 80), IBM Corporation, Part No. 68X2256, Order No. S68X-2256.

The operating system on which a preferred embodiment of the invention was implemented was Microsoft Windows/95, but it will be understood that a preferred embodiment could be implemented on other and different operating systems and, more importantly, could be integrated into, and therefore be a part of, an operating system.

Figure 1:
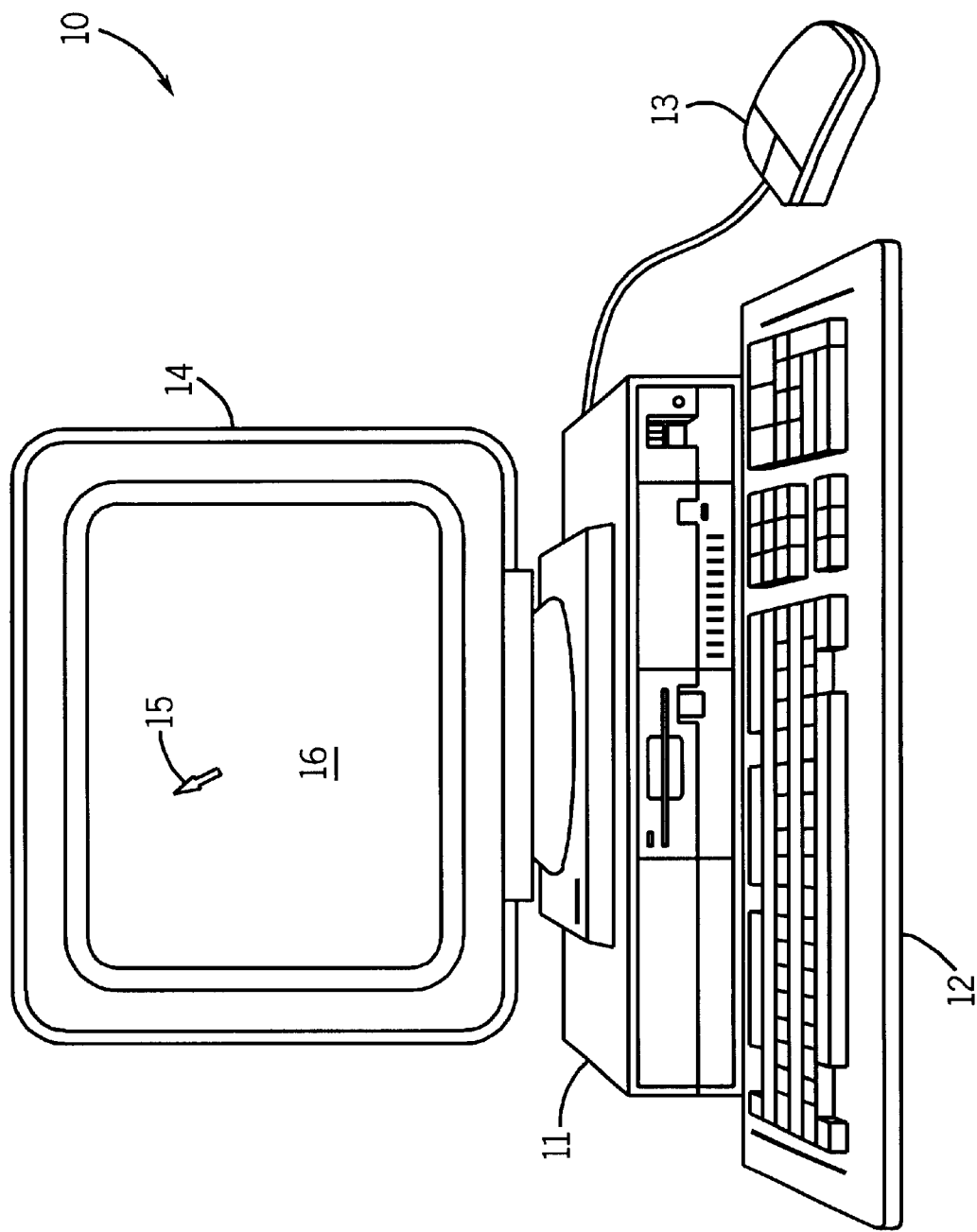
FIG. 1 is a representation of a personal computer system, including system, unit, keyboard, mouse and display.

Referring now to the drawings, and more particularly to FIG. 1, which depicts a personal computer 10 comprising a system unit 11, a keyboard 12, a mouse 13 and a graphics display device or monitor 14. The keyboard 12 and the mouse 13 constitute user input devices, and the display device 14 is a user output device. The mouse 13 is used to control a cursor 15 displayed on the screen 16 of the display device 14. The Graphic User Interface (GUI) supported by this system allows the user to "point-and-shoot" by moving the cursor 15 to an icon representing an object or specific location on the screen 16 and then press one of the mouse buttons to perform a user command or selection.

Figure 2:
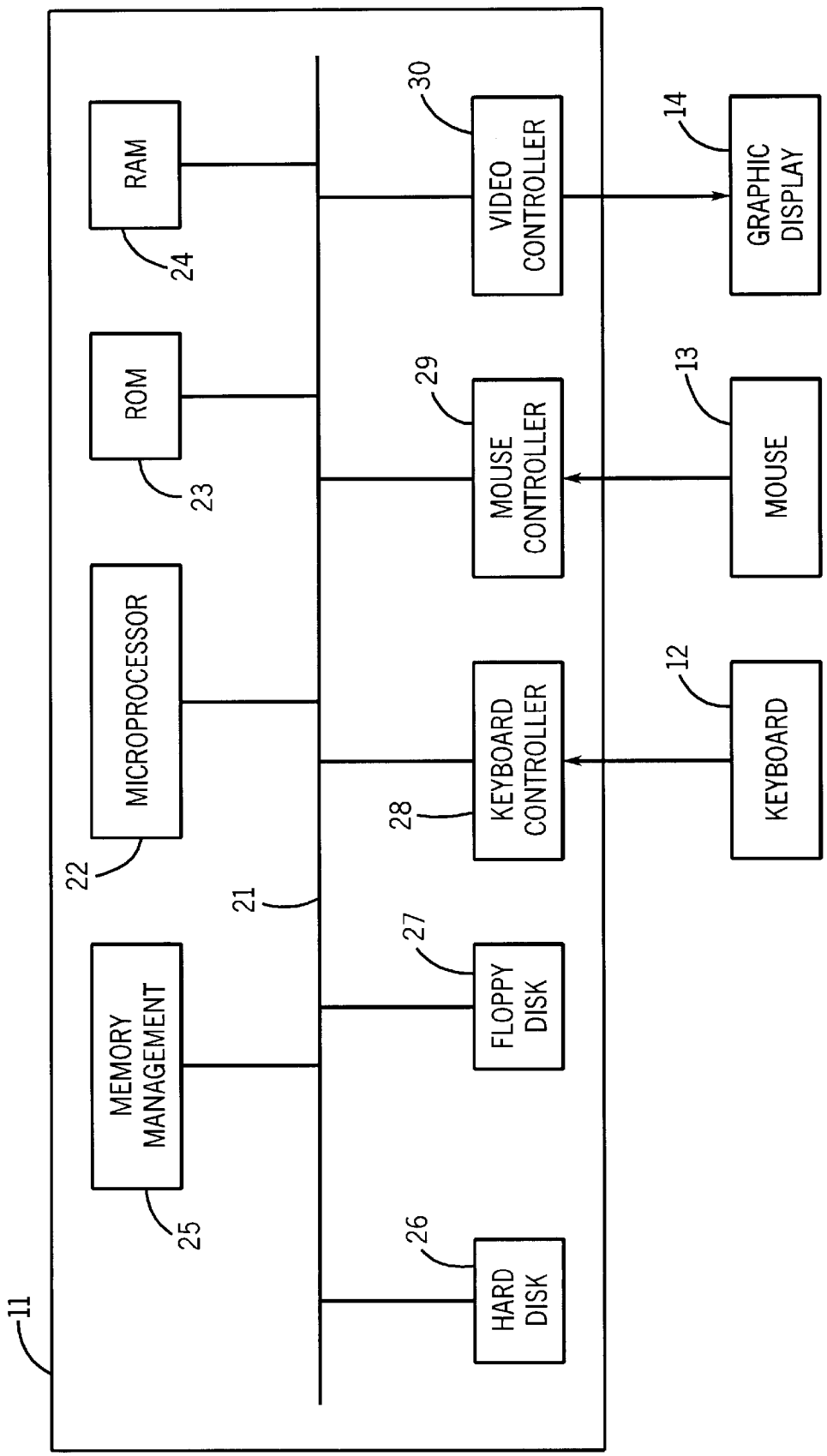
FIG. 2 is a block diagram of the computer system components in a typical personal computer system.

FIG. 2 shows in block diagram form the components of the personal computer shown in FIG. 1. The system unit 11 includes a system bus 21 to which the various components are attached and by which communication between the various components is accomplished. A microprocessor 22 is connected to the system bus 21 and is supported by Read Only Memory (ROM) 23 and Random Access Memory (RAM) 24, also connected to system bus 21. The microprocessor 22 in the IBM series of computers is one of the Intel Pentium family of microprocessors, but other microprocessors including, but not limited to, Motorola's family of microprocessors such as the Motorola 68XXX microprocessors and various RISC (Reduced Instruction Set Computer) microprocessors manufactured by IBM, Hewlett Packard, Sun Microsystems, Intel, Motorola and others may be used in a specific computer without departing from the claims.

The ROM 23 contains, among other code, the Basic Input/Output System (BIOS) which controls basic hardware operations, such as interactions of the disk drives and the keyboard. The RAM 24 is the main memory into which the operating system and application programs are loaded. A memory management chip 25 is connected to the system bus 21 and controls Direct Memory Access (DMA) operations, including paging data between RAM 24 and a hard disk drive 26 and a floppy disk drive 27.

To complete the description of the system unit 11, there are three I/O controllers. These are the keyboard controller 28, the mouse controller 29 and the video controller 30, all of which are connected to the system bus 21. As their names imply, the keyboard controller 28 provides the hardware interface for the keyboard 12, the mouse controller 29 provides the hardware interface for the mouse 13, and the video controller 30 provides the hardware interface for the graphic display device 14.

The hardware illustrated in FIGS. 1 and 2 is typical but may vary for a specific application; that is, there may be other peripherals, such as optical storage media, audio I/O, printers, programmable controllers and the like. One preferred embodiment of the invention is as an enhancement to the operating system that controls or "runs" the hardware described in FIGS. 1 and 2. As mentioned, a preferred embodiment may be added to an existing operating system or it may be integrated into the operating system, but it will be assumed for purposes of this disclosure that the operating system supports a GUI. The Windows/95 GUI will be utilized for demonstrative purposes.

Figure 3:
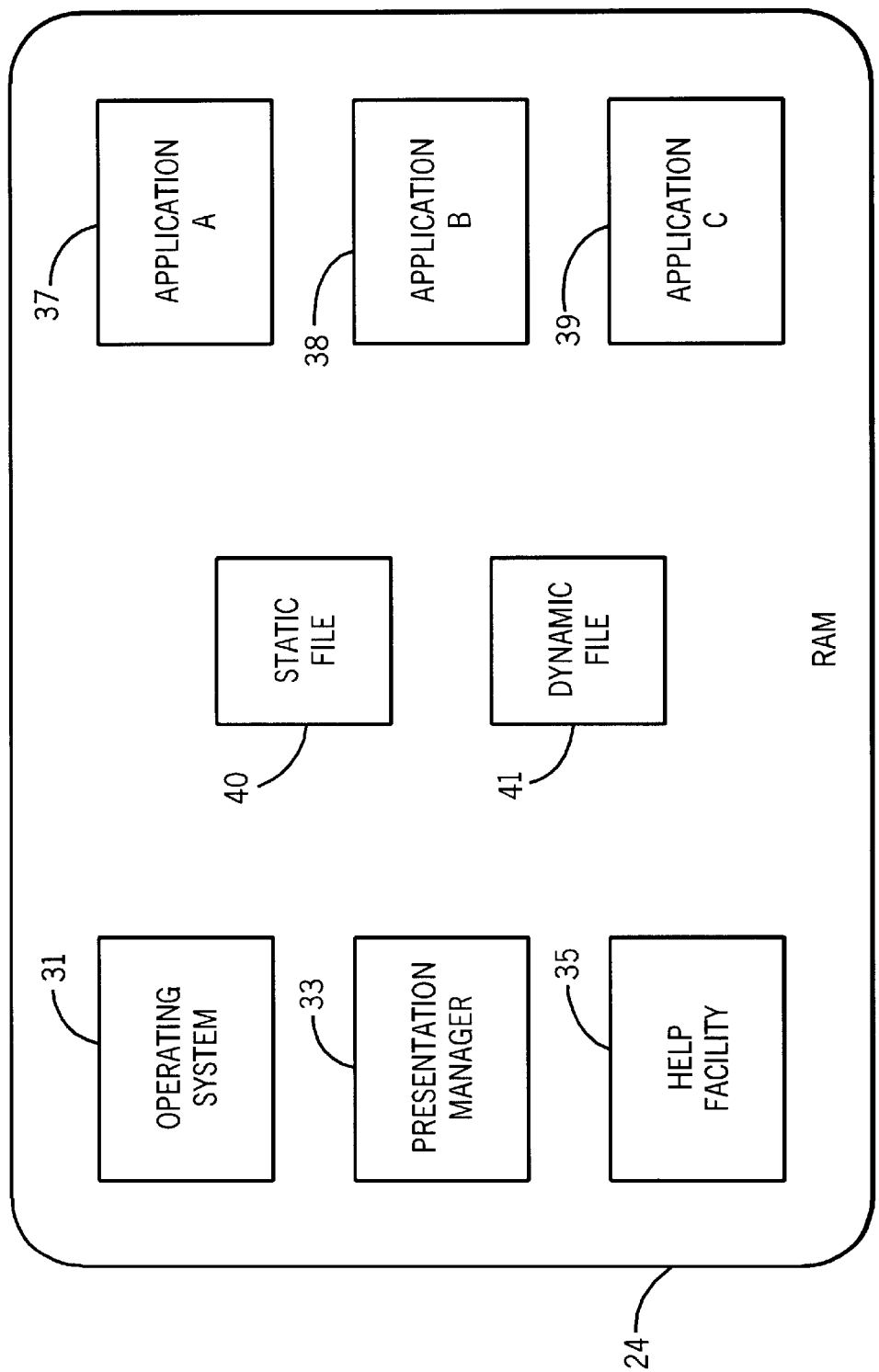
FIG. 3 depicts several applications active in the system memory, together with a help facility according to the present invention.

As shown in FIG. 3, an operating system 31 is shown resident in RAM 24 with an integrated operating environment or window manager 33. The operating system 31 is responsible for determining which user inputs from the keyboard 12 and the mouse 13 go to which of the applications, transmitting those inputs to the appropriate applications and performing those actions specified by the application in response to that input, e.g., displaying the result to the user on the graphic display 14. The integrated operating environment 33 can be considered part of the operating system 31 and is responsible for presenting the applications in a uniform and consistent manner within a graphical user interface. Also resident in RAM is the help facility 35 and applications A, B and C 37, 38 and 39, which represent three types of applications compatible with a preferred architecture of the help application 35. Other code modules used to control the graphic display 14 as well as interpret input from the keyboard 12 and mouse 13 are, resident in RAM 24, but are omitted for sake of clarity.

The first type of applications are aware applications represented by application number A37. Aware applications have been written with knowledge of the capability of the help facility 35, and therefore, have logic within them to dynamically update the shared memory in dynamic table database 41, from which the help facility 35 can read help information. The dynamic help table 41 is an additional shared memory segment to the static help contained in database table 40 which is loaded from disk storage 26. An ideal use for an aware application would be to reveal details about objects that change dynamically, such as the number and type of mail items contained in an In-basket icon.

The second type of application, e.g. application B 38, does not contain logic to update the shared memory in dynamic help table 41. Thus, with this type of application, only static information can be displayed by the help facility 35. However, the information can be modified to reflect language syntax pertinent to a particular instruction. Nonetheless, the information in the help database 40 can be modified to new versions of an old application to account for new releases or modifications of the application software.

The third type of application represented by application C 39 contains neither static nor dynamic help. This type of application is simply ignored by the help facility 35. However, the help facility 35 does not interfere with the operation of application C39 despite the fact that it is running on top of it. One feature of the present invention described below allows help information to be presented for generic objects associated with application C 39, despite the fact that there is no help information associated with the application.

When the help facility 35 initializes, it reads help strings from a file in disk storage 26. These strings are preferably placed in a shared memory segment so that they can be quickly accessed and are depicted as resident in a library database table 40 in RAM 24 in FIG. 3. While the description below describes a preferred embodiment in terms of sensing "objects" below the pointer, it should be understood that any feature in the user interface could have information associated with it. In most advanced GUIs, almost every visible feature is associated with an object. As the objects beneath the mouse are detected, Help facility 35 refers to this table 40. Help information is displayed to the user if it is associated with the object underneath the mouse pointer. The following description discusses the invention in connection with the mouse 13 and its pointer. Those skilled in the art would recognize that other pointing devices such as a touch sensor, graphic tablet, trackball or joystick as well as the cursor control keys on the keyboard 12 can be used to move a pointer across the display screen.

Figure 4:
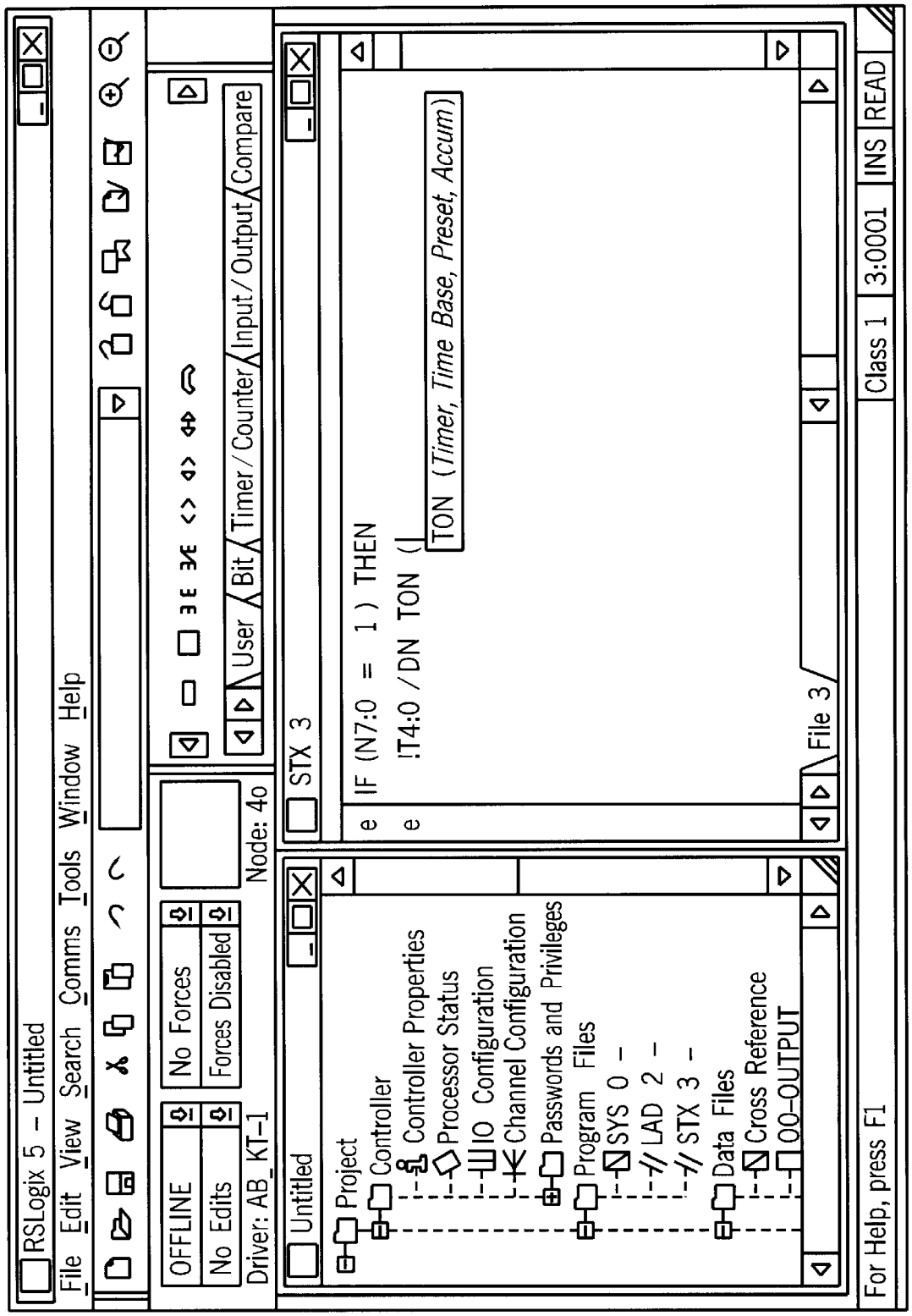
FIG. 4 depicts a display, which corresponds to a ladder logic software application that controls a programmable controller, for example, in accordance with a preferred embodiment.

FIG. 4 depicts a display, which corresponds to a ladder logic software application that controls a programmable controller, for example, in accordance with a preferred embodiment. Programmable controllers are well-known systems for operating industrial equipment, such as assembly lines and machine tools, in accordance with a stored program. In these controllers, a stored program is executed to examine the condition of specific sensing devices on the controlled equipment, and to energize or de-energize selected operating devices on that equipment contingent upon the status of one or more of the examined sensing devices. The program not only manipulates single-bit input and output data representing the state of the sensing and operating devices, but also performs arithmetic operations, timing and counting functions, and more complex processing operations.

One industry that extensively uses programmable controllers is the automotive industry. In the automotive industry, various automotive parts are conveyed along machine lines consisting of many consecutive workstations. Most workstations include at least one tool that performs some function to alter the characteristics of workpieces as they are delivered to the station. For example, an unfinished cast engine block that requires a plurality of holes, bores, and threads, as well as other metal-removing procedures, may be provided at the beginning of a machine line that produces finished engine blocks. The machine line may consist of any number of different stations, each station performing a different procedure on the unfinished block. An indexer in the form of a transfer bar can be arranged to move each block from one station to the next following a completed process. Typically, at each station the block would be clamped prior to any metal-removing operation.

In this type of system, a programmable controller would receive inputs from all of the various tools at all of the workstations and would provide activating output signals to synchronize machine operation. During metal-removing periods with the transfer bar out of the way, all of the tools would perform their functions. In between metal-removing periods during transfer periods, the tools would be parked, the clamps unclamped, and the transfer bar would advance workpieces from one station to the next.

Industrial controllers are frequently programmed in "Ladder" Logic (LL) where instructions are represented graphically by "contacts" and "coils" of virtual relays connected and arranged in ladder-like rungs across power rails. LL, with its input contacts and output coils, reflects the emphasis in industrial control on the processing of large amounts of input and output data.

LL also reflects the fact that most industrial control is "real time"; that is, an ideal industrial controller behaves as if it were actually composed of multiple relays connected in parallel rungs to provide outputs in essentially instantaneous response to changing inputs. Present industrial controllers do not, in fact, employ separate parallel relay-like structures, but instead simulate the parallel operation of the relays by means of a conventional Harvard or Von Neumann-type computer processor which executes instructions one at a time, sequentially. The practical appearance of parallel operation is obtained by employing extremely fast processors in the execution of the sequential control program.

As each rung is executed, inputs represented by the contacts are read from memory (as obtained from inputs from the controlled process or the previous evaluation of coils of other rungs). These inputs are evaluated according to the logic reflected in the connection of the contacts into one or more branches within the rungs. Contacts in series across a rung represent boolean AND logic whereas contacts in different branches and thus in parallel across the rung represent boolean OR logic.

Typically a single output coil at the end of each rung is set or reset. Then, based on the evaluation of that rung, this setting or resetting is reflected in the writing to memory of a bit (which ultimately becomes an output to the industrial process or to another LL rung).

Once a given rung is evaluated, the next rung is evaluated and so forth. In the simplest form of LL programming, there are no jumps, i.e. all rungs are evaluated in a cycle or "scan" through the rungs. This is in contrast to conventional computer programming, where branch and jump instructions cause later instructions or groups of instructions to be skipped, depending on the outcome of a test associated with those branch or jump instructions.

While LL is well suited for controlling industrial processes like those in the automotive industry, LL programming is not an intuitive process and, therefore, requires highly skilled programmers. Where hundreds of machine tool movements must be precisely synchronized to provide a machining process, programming in LL is extremely time consuming. The time and relative skill associated with LL programming together account for an appreciable percentage of overall costs associated with a control system. In addition, the final step in LL programming is typically a lengthy debugging and reworking step that further adds to overall system costs.

One way to streamline any type of programming is to provide predefined language modules, expressed in a language such as LL, which can be used repetitively each time a specific function is required. Because of the similar types of tools and movements associated with different machine-line stations, industrial control would appear to be an ideal industry for such language modules.

The predefined logic module approach works quite well for certain applications, like small parts-material handling or simple machining. The reason for this is that the LL required for these applications tends to be very simple. In small parts material handling applications the I/O count is low and the interfaces between modules are minimal. In fact, the mechanisms are often independent units, decoupled from neighboring mechanisms by part buffers such that no signals are required to be exchanged between modules. These "loosely coupled" systems lend themselves to "cut and paste" programming solutions.

But the predefined, fixed logic module approach does not work well for other applications, for example metal-removing applications. There are two main reasons for this. First, there can be considerable variation in how components, such as sensors and actuators, combine to produce even simple mechanisms. Second, processes like metal removing normally requires tightly controlled interaction between many individual mechanisms. Exchanging signals called interlocks, between the control logic modules of the individual mechanism controls the interaction. The application of specific interlocks depends on knowledge of the process and the overall control strategy, information not generally needed, or knowable, when the control logic for each mechanism is defined.

For example, a drill is a typical metal-removing tool used in the automotive industry. In this example an ideal drill is mounted on a carriage that rides along a rail between two separate limiting positions on a linear axis, an advanced position and a returned position. Two limit switches, referred to herein as returned and advanced LSs, are positioned below the carriage and, when tripped, signal that the drill is in the returned and advanced positions, respectively. Two separate dogs (i.e. trigger extensions), an advanced dog and a returned dog, extend downwardly from the bottom of the carriage to trip the LSs when the advanced and returned positions are reached, respectively. In the ideal case, both LSs may be assumed to be wired in the same "normally opened" manner, so that electrically speaking they are open when released and closed when triggered. In this ideal case, where the physical characteristics of the switches are limited, a single LL logic rung can determine when the drill is in the returned position and another rung can determine when the drill is in the advanced position.

Unfortunately, in reality, there are electrically two types of LSs, one LS type being wired normally opened and the other type wired normally closed. Furthermore, any LS can be mechanically installed in a tripped when activated configuration, or a released-when-activated configuration. All combinations of these types are used for various types of applications. Thus, application requirements may demand control logic capable of handling any configuration of LS types.

Simple mathematics demonstrates that with two different electrical types of LSs and two mechanical configurations, there are sixteen possible configurations of a two-position linear slide. Consider the language modules required to implement position logic for all these configurations. To accommodate all sixteen-switch configurations, there could be sixteen different language modules, each containing fixed LL logic, and each named for the case it could handle. In this case, there would be duplicate logic under different names. Alternatively, four unique language modules could be provided, but then the user would have difficulty identifying which of the sixteen physical configurations that the four modules could handle.

Clearly, even for a simple drill mounted on a two position linear slide, application variables make it difficult to provide a workable library of fixed language modules. Adding more switches to the linear slide only increases, to an unmanageable level, the number of language modules required in the library.

Moreover, the contents of a complete language module for a drill must also consider other variables. These variables include, for example, the number and type of actuators required; the type of spindle, if any; whether or not a bushing plate is required; what type of conveyor is used; whether or not the drill will include an operator panel to enable local control; and, if an operator panel is included, what type of controls (i.e. buttons, switches and indicator lights) are required; just to name a few. Each tool variable increases the required number of unique LL modules by more than a factor of two, which makes it difficult at best to provide an LL library module for each possible drill configuration.

Taking into account the large number of different possible machine-line tools, each tool having its own set of variables, the task of providing an all-encompassing library of fixed language modules becomes impractical. Even if such a library could be fashioned, the task of choosing the correct module to control a given tool would probably be more difficult than programming the required LL logic from scratch.

For these reasons, although attempts have been made at providing comprehensive libraries of fixed language modules, none has proven particularly successful and much LL programming is done from scratch.

Therefore, in order to reduce programming time and associated costs, it would be advantageous to have a more flexible means of specifying and simulating control logic that provides for the specification of truly reusable sections of LL or other control logic. Furthermore, it would be advantageous if a library of reusable modules enabled industrial engineers less-skilled in programming to provide complete control logic programs and to reduce required debugging time. Also, it would be advantageous if such a library of reusable modules could be accessed using a programming apparatus such as a personal computer, or the like, to further minimize programming time and cost. Moreover, it would be extremely useful if the environment that was targeted for control could be modeled utilizing a realistic graphical depiction of the environment. Finally, it would be very helpful to allow the model to simulate and depict the sensor environment realistically as the sensor environment steps through its processing.

In FIG. 4, as a user types, "TON("400 (indicative of a timer on instruction) in the structured text editor, application C 39 matches the instruction 400 to a static file index key 40 and presents a syntax guide 405 proximal to the instruction to assist the user with the syntax associated with the instruction. In addition, the current parameter that must be entered next "Timer" 410 is presented in bold text. In a preferred embodiment, as shown in FIG. 4, the syntax guide appears directly below the user instruction. This feature relieves the user from the tedious chore of looking up instruction syntax in a manual or an online help facility. FIG. 4 shows this feature in a structured text editor.

Figure 5:
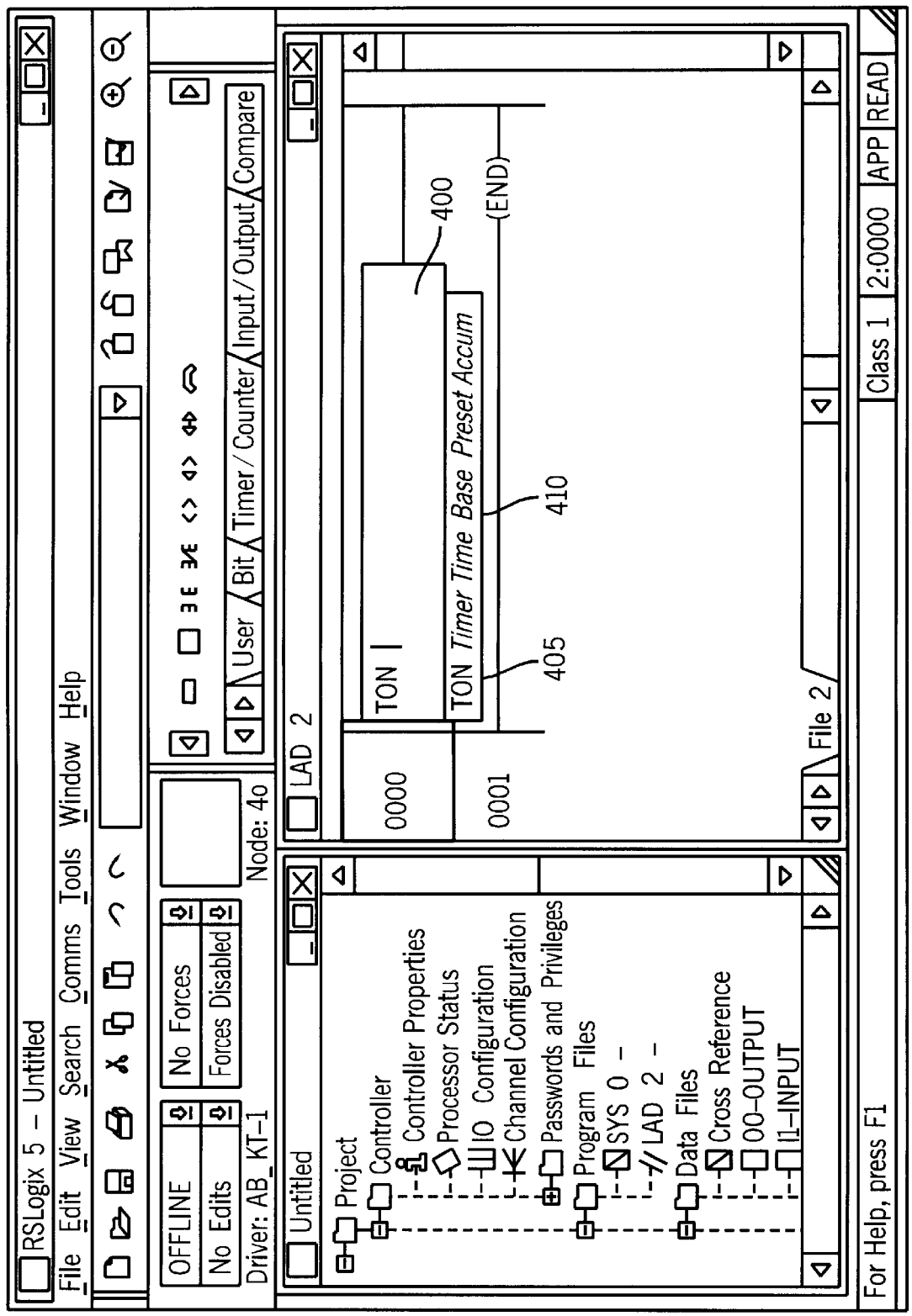
FIG. 5 depicts a display, which corresponds to a ladder logic software application that controls a programmable controller, for example, in accordance with a preferred embodiment.

FIG. 5 illustrates the feature in an ASCII ladder rung editor. In both cases, the information displayed is presented proximal to the instruction on the display and provides the next parameter that is required for the instruction in bold text. This facilitates ergonomic interaction with the instruction syntax and achieves a higher level of productivity.

Figure 6:
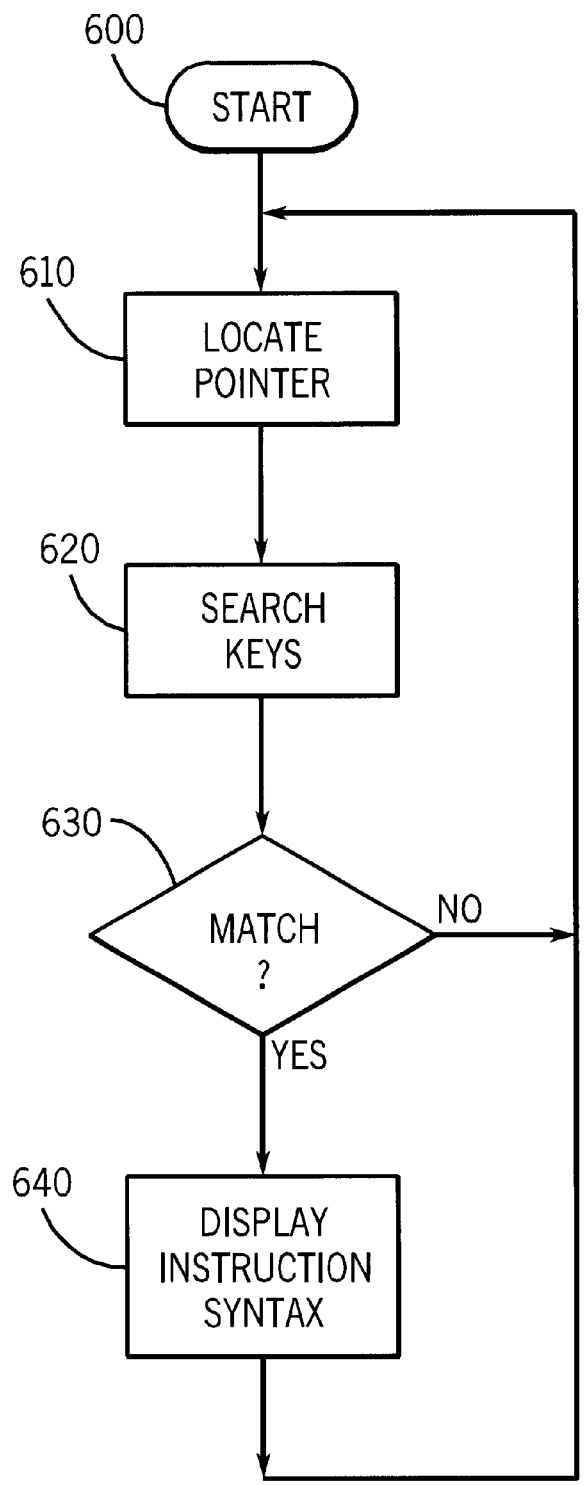
FIG. 6 is a flowchart depicting the logic in accordance with a preferred embodiment.

FIG. 6 is a flowchart depicting the logic in accordance with a preferred embodiment. Processing commences at terminal 600 and immediately passes to function block 610 to determine the location of the pointer on the display. Then, in function block 620, the current instruction is utilized to search the static database 40 to determine if help for the instruction is available. If a match is identified in the keys of the database 40 at decision block 630, then the instruction syntax is displayed proximal to the instruction as discussed in function block 640 and control is returned to function block 610 to await the next instruction. If no match is determined in decision block 630, then control is returned to function block 610 to await the next instruction.

Figure 7:
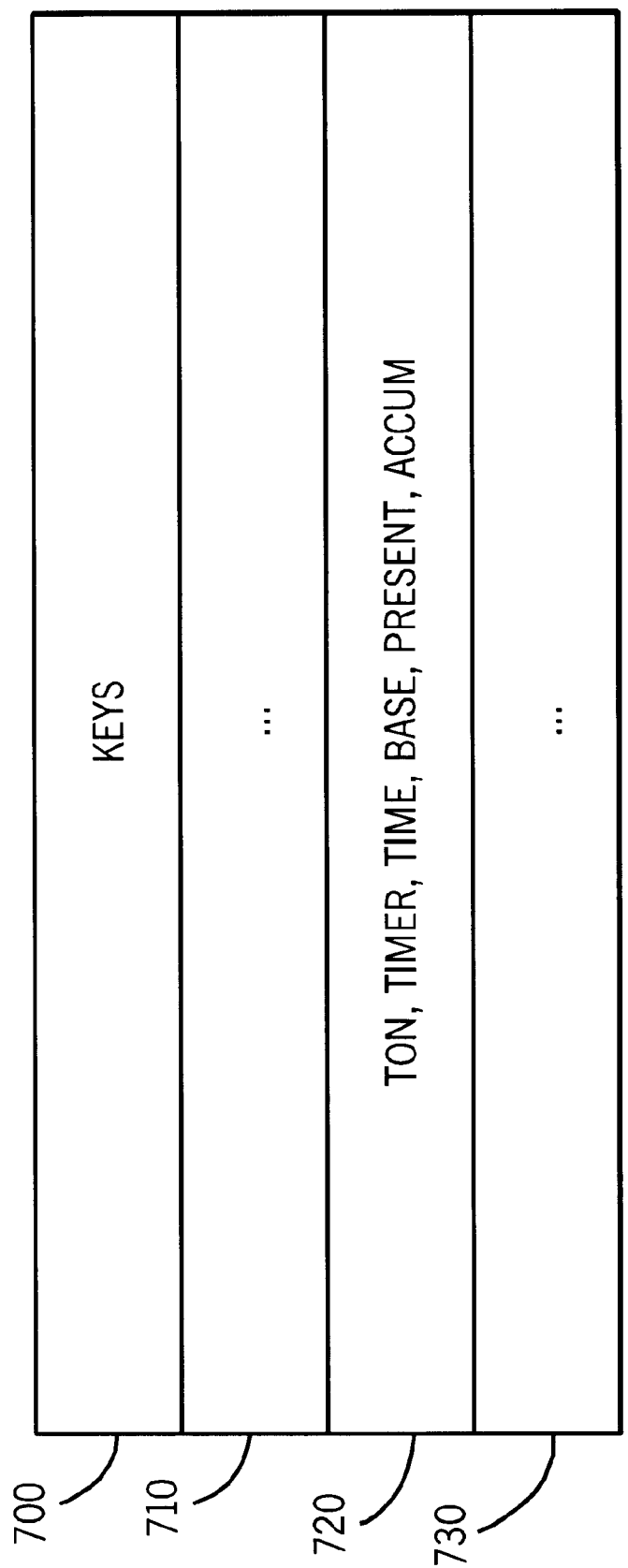
FIG. 7 is a data map for the static database 40 in accordance with a preferred embodiment.

FIG. 7 is a data map for the static database 40 in accordance with a preferred embodiment. The keys 700 are listed in alphabetical order as they occur in the database. The keys correspond to the instructions of a particular language. The syntax of each instruction appears in each record with each parameter associated with the instruction as depicted at 720. Other records 710 and 730 represent the syntax of each of the other instructions of the language. The instructions are stored sequentially after the keys 700. This allows the list of instructions to be accessed and returned for display in an efficient manner in support of function block 640 of FIG. 6.

While the invention has been described with respect to particular embodiments above, it would be understood by those skilled in the art that modifications may be made without departing from the spirit and scope of the present invention. These embodiments are for purposes of example and illustration only and are not to be taken to limit the scope of the invention narrower than the scope of the appended claims.

Having thus described our invention, what we claim as new, and desire to secure by Letters Patent is:

1. A method of displaying contextual help for a system, the system operating according to instructions, the instructions being entered by a user in a format including a predefined base instruction and at least one parameter, the method comprising steps of:
 (a) obtaining a predefined base instruction entered by a user;
 (b) searching a database to obtain syntax for the instruction, the syntax identifying the at least one parameter associated with the instruction; and
 (c) presenting, in a pop-up area, the syntax for the instruction proximal to the instruction on the display as the instruction is being entered.

2. The method as recited in claim 1, which further comprises presenting a next parameter for the instruction with an indicia on the display.

3. The method as recited in claim 1, which further comprises the step of storing delimited instructions in the database preceding the instruction syntax information.

4. The method as recited in claim 3, wherein the delimited instructions serve as indexes to the instruction syntax information.

5. The method as recited in claim 1, wherein the syntax is presented immediately below the instruction on the display.

6. A system for displaying contextual help, comprising:
 (a) instruction retrieval software for identifying a predefined instruction entered by a user, the predefined instruction including an instruction base and at least one parameter;

(b) a database search engine for obtaining syntax for the predefined instruction, the syntax identifying the at least one parameter and an input format for the at least one parameter; and (c) display software for presenting, in a pop-up area, the syntax for the instruction proximal to the instruction on the display as the instruction is being entered.

7. A system as recited in claim 6, wherein a next parameter is presented for the instruction with an indicia on the display.

8. A system as recited in claim 6, wherein delimited instructions are stored in the database preceding the syntax.

9. A system as recited in claim 8, wherein the delimited instructions serve as indexes to the syntax.

10. A system as recited in claim 6, wherein the syntax is presented immediately below the instruction on the display.

11. A computer program embodied on a computer-readable medium for displaying contextual help, comprising:

(a) an instruction retrieval code segment that identifies a predefined instruction entered by a user, the predefined instruction including an instruction base and at least one parameter;

(b) a database code segment that obtains syntax for the predefined instruction; and (c) a display code segment that presents the syntax, in a pop-up area that is proximal to the instruction on the display, as the instruction is being entered, the syntax identifying the at least one parameter and an input format for the at least one parameter.

12. A computer program as recited in claim 11, wherein a next parameter is presented for the instruction with an indicia on the display.

13. A computer program as recited in claim 11, wherein the at least one parameter is highlighted with respect to the instruction base.

14. A computer program as recited in claim 13, wherein a next parameter is displayed and highlighted once the at least one parameter is entered.

15. A computer program as recited in claim 12, wherein the next parameter is highlighted using bold text.

16. An industrial equipment system, comprising:

a machine tool subject to control by a programmable controller;

a programmable controller in communication with the machine tool, the programmable controller having a display and a user interface, the user interface allowing entry of a plurality of predefined instructions, each of the predefined instructions including an instruction base and at least one parameter, the programmable controller providing instruction syntax help by obtaining at least part of the instruction base, the programmable controller searching a database to obtain syntax for the instruction base and presenting the syntax for the instruction in a pop-up area that is proximal to the instruction on the display, the syntax including identification of the at least one parameter.

17. The industrial equipment system of claim 16, wherein a next parameter is presented for the instruction with an indicia on the display.

18. The industrial equipment system of claim 16, wherein delimited instructions are stored in the database preceding the instruction syntax information.

19. The industrial equipment system of claim 18, wherein the delimited instructions serve as indices to the instruction syntax information and the programmable controller is a computer.

20. The industrial equipment system of claim 16, wherein the instruction syntax information is presented immediately below the instruction on the display.

21. A system for displaying contextual help on a display of a programmable controller, the programmable controller operating a machine tool, the system comprising:

(a) instruction retrieval software for identifying a predefined instruction, the predefined instruction relating to the operation of the machine tool and including an instruction base and at least one parameter;

(b) a database search engine for obtaining syntax for the predefined instruction, the syntax identifying the at least one parameter and an input format for the at least one parameter; and (c) display software for presenting, in a pop-up area, the syntax for the instruction proximal to the instruction on the display of the programmable controller.

22. A computer program for displaying contextual help on a display of a programmable controller, the computer program stored in the programmable controller, the programmable controller operating a machine tool, the computer program comprising:

(a) an instruction retrieval code segment that identifies a predefined instruction, the predefined instruction relating to the operation of the machine tool and including an instruction base and at least one parameter;

(b) a database code segment that obtains syntax for the predefined instruction; and (c) a display code segment that presents the syntax in a pop-up area that is proximal to the instruction on the display, the syntax identifying the at least one parameter and an input format for the at least one parameter.

* * * * *